United States Patent [19]

Miyazaki

[11] Patent Number: 4,966,041

[45] Date of Patent: Oct. 30, 1990

[54] DISPLACEMENT DETECTION DEVICE

[75] Inventor: Hiroya Miyazaki, Tamamura, Japan

[73] Assignee: Nippon Seiko Kabushiki Kaisha, Tokyo, Japan

[21] Appl. No.: 285,072

[22] Filed: Dec. 16, 1988

[30] Foreign Application Priority Data

Dec. 8, 1987 [JP] Japan .................................. 62-308650

[51] Int. Cl.⁵ ...................... G01L 3/10; G01R 33/06; H01L 43/06
[52] U.S. Cl. .................................. 73/862.33; 324/225; 324/207.2; 338/32 H
[58] Field of Search ......... 73/862.33, 862.31, DIG. 3; 324/208, 251, 225; 338/32 H

[56] References Cited

U.S. PATENT DOCUMENTS

| 3,379,057 | 4/1968 | Hegenbart | 73/862.31 X |
| 4,107,604 | 8/1978 | Bernier | 324/208 |
| 4,425,557 | 1/1984 | Nakamura | 338/32 H |
| 4,731,579 | 3/1988 | Petersen et al. | 338/32 H X |
| 4,857,842 | 8/1989 | Sturman et al. | 338/32 H X |

Primary Examiner—Charles A. Ruehl
Attorney, Agent, or Firm—Basile and Hanlon

[57] ABSTRACT

A pair of permanent magnets adjoining each other and magnetized with opposite polarities are coupled with a movable object through a connecting shaft so that the pair of permanent magnets are aligned in a direction of displacement of the movable object. A first and a second Hall element is disposed stationary at a position opposing to the pair of permanent magnets and aligned also in the direction of displacement of the movable object with a predetermined space interval between the first and second Hall elements. When the movable object is displaced in one direction, and hence the pair of magnets are moved from a neutral position at which the boundary of the pair of magnets corresponds to the center of the interval of the first and second Hall elements, output voltages of different phases are respectively generated by the first and second Hall elements. An input current corresponding to a difference value between the output voltages is supplied to each of the first and second Hall elements to compensate for a change in characteristics of the permanent magnets and Hall elements due to a change in ambient temperature.

4 Claims, 6 Drawing Sheets

DISPLACEMENT DETECTION DEVICE

BACKGROUND OF THE INVENTION

1. Field of the Invention

The present invention relates to a displacement detection device for detecting a displacement of an object by using a Hall effect element, and in particular, to a displacement detecting device suitable for application to a torque detector of an electric steering for vehicles.

2. Description of the Prior Art

Generally, in a displacement detection device using a Hall element, since the Hall element per se is temperature dependent, it is necessary to perform temperature compensation.

In order to achieve temperature compensation, in the prior art device, generally, as shown in FIG. 7a, a thermistor 51 has been inserted in the input current circuit of a Hall element 50. Alternatively, as shown in FIG. 7b, a thermistor 52 has been inserted in the voltage output side of a Hall element 50, or as shown in FIG. 7c, a constant voltage input circuit has been used.

However, in the prior art temperature compensation system of the Hall element, since the flux density of a magnet changes with a change in temperature, it is necessary to compensate for such flux density sensitivity at the same time. As a result, a compensating circuit becomes complicated and still it has been difficult to attain accurate sensitivity compensation. Moreover, another problem is involved in that it has been impossible to inclusively compensate for non-uniformities in changes in characteristics of the Hall element and the magnet due to temperature, and accurate detection of a displacement has not been achieved.

Furthermore, when a set of Hall elements are used to detect displacement based on their output voltages, if abnormalities occur in the output voltages of the Hall elements, it has been impossible to detect the abnormality.

SUMMARY OF THE INVENTION

It is an object of the invention to provide a displacement detection device capable of achieving temperature compensation and sensitivity compensation including non-uniformity in changes in the characteristics of a Hall element and a magnet due to temperature change.

It is another object of the invention to provide a displacement detection device capable of detecting an abnormal state thereof by monitoring a displacement detection voltage of the displacement detection device.

In order to achieve the above objects, in one aspect of the invention, a displacement detection device comprises a pair of magnets, magnetized with opposite polarities and arranged adjoining each other in a displacement direction of a movable object to which the pair of magnets are coupled, a first and a second Hall element disposed at a position opposing the pair of magnets and arranged in the displacement direction of the movable object with a predetermined interval therebetween, the pair of magnets moving relative to the first and the second Hall element with displacement of the movable member, a current control circuit for supplying the first and the second Hall element with an input current corresponding to a difference value between the output voltages of the first and the second Hall element.

In another aspect of the invention, a displacement detection device comprises a pair of magnets magnetized with opposite polarities and arranged adjoining each other in a displacement direction of a movable object to which the pair of magnets are coupled, a first and a second Hall element disposed at a position opposing the pair of magnets and arranged in the displacement direction of the movable object with a predetermined interval therebetween, the pair of magnets moving relative to the first and the second Hall element with displacement of the movable member, a current control circuit for supplying the first and the second Hall element with an input current corresponding to a difference value between output voltages of the first and the second Hall element, and an abnormal state detection circuit for detecting the presence or absence of an abnormal state by comparing the difference value between the outputs of the first and second Hall element with a reference value.

In the first aspect of the invention, the first and the second Hall element are disposed opposing to the pair of magnets of opposite polarities and arranged in the displacement direction of the movable object with a predetermined space therebetween, and have output displacement detection voltages with different phases. The current control circuit supplies an input current to the first and the second Hall element corresponding to the difference value between the displacement detection voltages. Specifically, when the ambient temperature of the first and the second Hall element rises, the sensitivity of the Hall elements is lowered and at the same time, the magnetic field of the magnets weakens. As a result, the inclination of the detection voltages of the first and second Hall element becomes small, and the difference voltage between both the displacement detection voltages becomes small. Accordingly, the input current to the first and the second Hall element is increased by the current control circuit thereby to correct the inclination of the displacement detection voltages of the first and the second Hall element. Thus, the temperature compensation and the sensitivity compensation are achieved, and accurate displacement voltages can be obtained.

In the other aspect of the invention, in addition to the first aspect, the abnormal state detection circuit compares the difference value between the displacement detection voltages outputted from the first and the second Hall element with the reference value, and when the difference value of the displacement detection voltages exceeds the reference value, it is determined that one of the first and the second Hall elements is in an abnormal state. In other words, when one of the Hall elements fails, the difference value between the first and the second Hall element will deviate from a difference value at a normal state. Accordingly, by monitoring the difference value between both Hall elements, it is possible to detect an abnormal state of the Hall elements.

BRIEF DESCRIPTION OF THE DRAWINGS

FIGS. 1a and 1b show an embodiment of the invention in which FIG. 1a is a longitudinal sectional view and FIG. 1b is a sectional view taken along the line B—B of FIG. 1a;

DESCRIPTION OF THE PREFERRED EMBODIMENTS

Figure 1A:
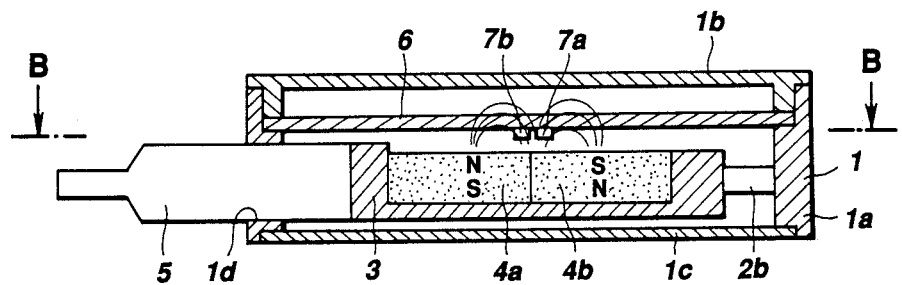
Figure 1B:
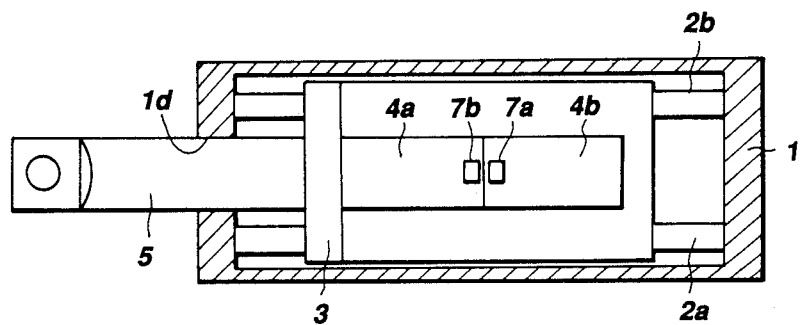

Referring to FIGS. 1a and 1b, a casing 1 comprises a square frame 1a having openings in its upper and lower sides. An upper plate 1b and a lower plate 1c close the upper and lower sides of the square frame 1a.

Fixedly disposed within square frame 1a are guide rods 2a and 2b. The guide rods are fixed between longitudinal opposite ends in a side by side parallel relationship to each other, as shown in FIG. 1b, and a magnet holder 3, of non-magnetic substance, is slidably mounted thereon. A pair of permanent magnets 4a and 4b are secured to the magnet holder 3, in alignment with the direction of movement, and adjoining each other so that the upper surfaces thereof are exposed. The permanent magnets 4a and 4b are magnetized with opposite polarities such that the permanent magnet 4a has an N-pole on the upper side and an S-pole on the lower side and the permanent magnet 4b has an S-pole on the upper side and an N-pole on the lower side. As a result, the magnetic field is zero at the adjoining position of the permanent magnets 4a and 4b, and a positive magnetic field is formed on the permanent magnet 4a, and a negative magnetic field is formed on the permanent magnet 4b.

A connecting shaft 5 is attached to the outside surface of one longitudinal end (left end of the Figure) of the magnet holder 3. The connecting shaft 5 extends outwardly through a through hole 1d formed in an end plate (left end plate in the Figure) of the square frame 1a. The connecting shaft 5 is coupled to a movable object (not shown) whose displacement is to be detected.

Figure 3:
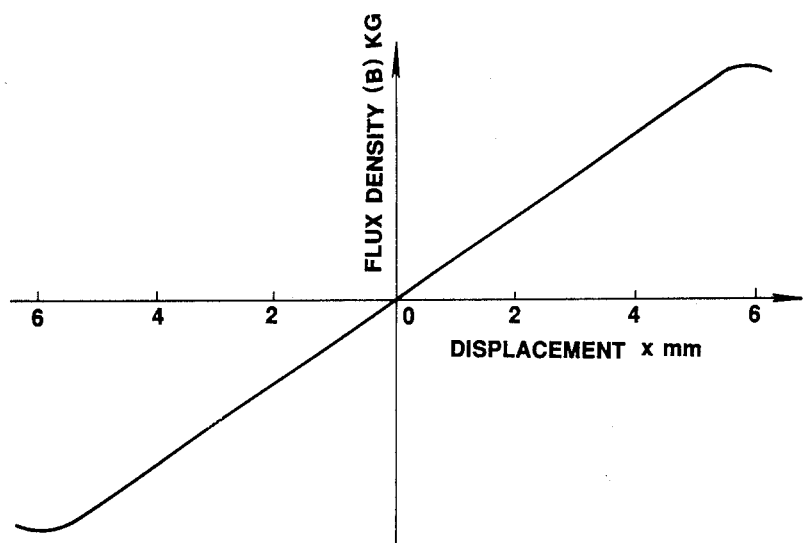
FIG. 3 is a graph of a characteristic curve showing a relation between a displacement of the magnets and flux density.

A printed substrate 6 is supported above the magnet holder 3 with its opposite ends pressed against the opposite end plates of the square frame 1a by the upper plate 1b. On the lower surface of the printed substrate 6, a first and a second Hall element 7a and 7b are provided at a position opposing the boundary position of the permanent magnets 4a and 4b when the magnet holder 3 is positioned at a central portion of the square frame 1a; that is, the magnet holder 3 is in a neutral condition. The first and the second Hall elements 7a and 7b are spaced from each other by a predetermined interval along the direction of movement of the magnet holder 3, and are fixed in stationary positions. Electronic circuit elements constituting a control device described below, are mounted on the printed substrate 6. The amount of displacement of the magnet holder 3 and the flux density at a central portion between the Hall elements 7a and 7b are set to be in a relationship as shown in FIG. 3. Specifically, when the magnet holder 3 is displaced from the neutral position in a right or left direction, in the displacement to the left direction, in the embodiment described, the flux density is decresed in reverse proportion to an increase in the amount of displacement, whereas in the displacement to the right direction, the flux density is increased in direct proportion to an increase in the amount of displacement.

Figure 2:
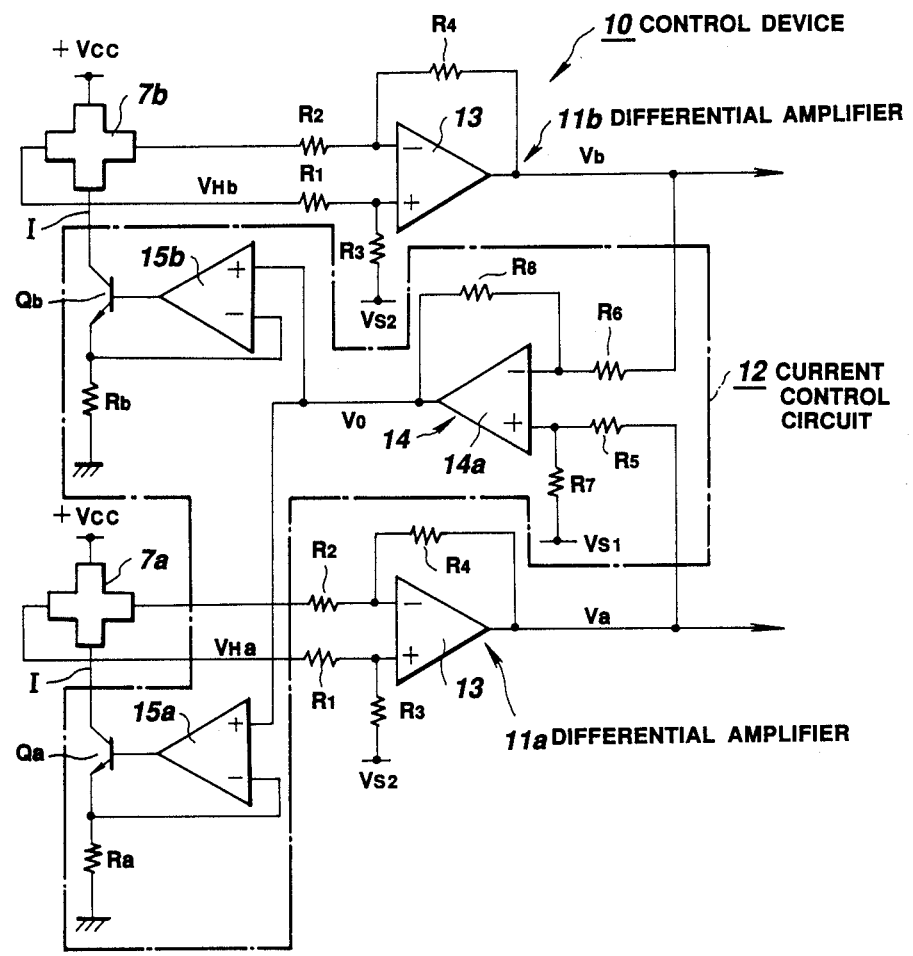
FIG. 2 is a circuit diagram of an example of a control circuit in the invention.

The Hall elements 7a and 7b are connected to the control device 10 as shown in FIG. 2.

The control device 10 includes differential amplifiers 11a and 11b respectively connected to voltage outputs of the Hall elements 7a and 7b, and a current control circuit 12 connected to the current inputs of the Hall elements 7a and 7b.

The differential amplifier 11a includes an operational amplifier 13 having a non-inverting terminal and an inverting terminal respectively connected to the voltage outputs of the Hall element 7a through resistors $R_1$ and $R_2$ respectively. A resistor $R_3$ is inserted between the non-inverting terminal and a positive power supply, and a resistor $R_4$ is inserted between the inverting terminal and the output of the operational amplifier 13. The differential amplifier 11b includes an operational amplifier 13 which is connected to the Hall element 7b, etc., in the same way as the differential amplifier 11a.

The current control circuit 12 includes a transistor Qa having a collector connected to the second current input of the Hall element 7a whose first current input is connected to a positive power supply, a transistor Qb having a collector connected to the second current input of the Hall element 7b whose first current input is connected to the positive power supply, resistors Ra and Rb respectively connected between the emitter of transistor Qa and ground and between the emitter of transistor Qb and ground a differential amplifier 14, having inputs respectively connected to receive output voltages Va and Vb of the differential amplifiers 11a and 11b, and operational amplifiers 15a and 15b having non-inverting terminals supplied with an output voltage Vo of the differential amplifier 14 and having inverting terminals respectively connected to receive the emitter voltage from the transistors Qa and Qb, and having outputs respectively connected to the bases of the transistors Qa and Qb. The transistors Qa and Qb, resistors Ra and Rb, and operational amplifiers 15a and 15b constitute a constant current circuit. In this respect, the differential amplifier 14 includes an operational amplifier 14a having a non-inverting terminal connected to receive an output voltage Va of the differential amplifier 11a through a resistor $R_5$, and an inverting terminal connected to receive an output voltage Vb of the differential amplifier 11b through a resistor $R_6$. Furthermore, a resistor $R_7$ is connected between the non-inverting terminal of the operational amplifier 14a and a positive power supply $V_{st}$ ', and a resitor $R_8$ is connected between the output and the inverting terminal of the amplifier 14a.

The operation of the above embodiment will now be described. It is assumed that the differential amplifiers 11a and 11b, and the current control circuit 12 are adjusted to produce displacement detection voltages Va and Vb represented respectively by characteristic curves $l_{a1}$ and $l_{b1}$ shown in FIG. 4 by parallel solid lines, when the ambient temperature of the permanent magnets 4a and 4b, and the Hall elements 7a and 7b is, for example, at a normal temperature, and when the magnet holder 3 is displaced from the neutral position.

In this condition, when the ambient temperature of the permanent magnets 4a and 4b and the Hall elements 7a and 7b rises, the flux density produced by the permanent magnets 4a and 4b decreases and the sensitivity of the Hall elements 7a and 7b decreases. As a result, the inclination of the output voltages Va and Vb of the differential amplifiers 11a and 11b with respect to the displacement x, that is, the rate of change of voltage, decreases as shown by characteristic curves $l_{a2}$ and $l_{b2}$ in FIG. 4. When the rate of change of the output voltages Va and Vb decreases, the difference value (Vb−Va) between the output voltages Va and Vb also decreases. Consequently, the output voltage Vo of the differential amplifier 14 of the current control circuit 12 is increased with a decrease of the difference value (Vb−Va), because the output voltage Vo is represented by $Vo = V_{s1} - k(Vb - Va)$, where $V_{s1}$ is a voltage of the DC power supply connected to the non-inverting terminal through the resistor R7, and k is a constant determined by the resistors R5 to R8. This output voltage Vo is inputted to the non-inverting terminals of the operational amplifiers 15a and 15b. Accordingly, the output voltages of the operational amplifiers 15a and 15b are increased, and hence the current flowing through collector-emitter circuits of the transistors Qa and Qb is increased resulting in an increase in the current supplied to the Hall elements 7a and 7b.

When the current supplied to the Hall elements 7a and 7b is increased, the inclination of the output voltage, that is, the rate of change of the voltage of each of the Hall elements 7a and 7b, is increased, and the rate of change of voltage for each of the output voltage Va and Vb is also increased.

Figure 4:
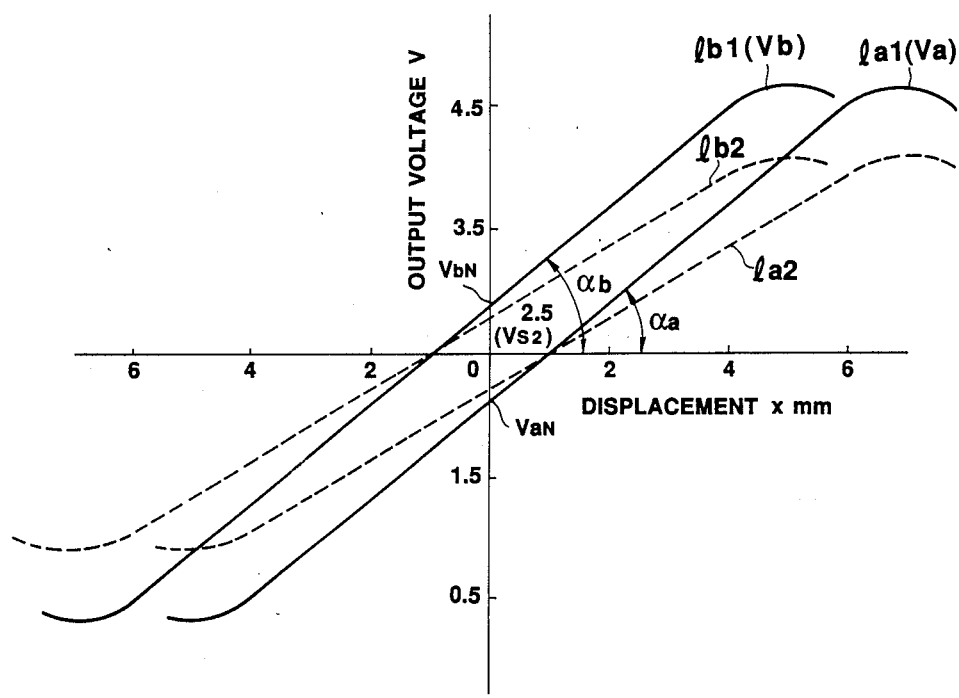
FIG. 4 is a graph of characteristic curves showing relationships between a displacement of the magnets and the output voltages of a differential amplifier.

Specifically, the relationships between the output voltages Va and Vb, and the displacement x in FIG. 4 are represented by the following formulas (1) and (2).

$$x = -\alpha Va - \beta \quad (1)$$

$$x = -\alpha Vb + \beta \quad (2)$$

Furthermore, the output voltages Va and Vb are represented by the following formulas (3) and (4).

$$Va = V_{S2} - kV_{Ha} \quad (3)$$

$$Vb = V_{S2} - kV_{Hb} \quad (4)$$

Where, $V_{S2}$ is a positive DC power supply voltage inputted to the non-inverting terminals of the differential amplifiers 11a and 11b through the resistor R3, and $V_{Hb}$ are the output voltages of the Hall elements 7a and 7b.

The output voltages $V_{Ha}$ and $V_{Hb}$ are represented by the following formulas (5) and (6).

$$V_{Ha} = (R_H/d)IB \quad (5)$$

$$V_{Hb} = (R_H/d)IB \quad (6)$$

Where, $(R_H/d)$ is a product sensitivity, I is an input current, and B is a flux density.

Accordingly, by substituting the formulas (3) to (6) for the formulas (1) and (2), the inclinations of the characteristic curves $l_1$ and $l_2$ in FIG. 4 are calculated and represented by the following formulas (7) and (8).

$$\alpha_a = (\beta - x)/\{V_{S2} - (R_{Ha}/d)IB\} \quad (7)$$

$$\alpha_b = (\beta - x)/\{V_{S2} - (R_{Hb}/d)IB\} \quad (8)$$

As will be apparent from the formulas (7) and (8), when the currents I supplied to the Hall elements 7a and 7b are increased, the sensitivity of the Hall elements 7a and 7b becomes high, and the inclinations $\alpha_a$ and $\alpha_b$ of the output voltages Va and Vb of the differential amplifiers 11a and 11b are increased.

When the inclinations $\alpha_a$ and $\alpha_b$ of output voltages Va and Vb increase, the output voltage Vo of the differential amplifier 14 of the current control circuit 12 is decreased. However, the input current I of the Hall elements 7a and 7b is decreased correspondingly, and the inclinations $\alpha_a$ and $\alpha_b$ of the output voltages Va and Vb of the differential amplifiers 11a and 11b are decreased. As a result, the output voltage Vo of the differential amplifier 14 is increased, and eventually, the difference value (Vb−Va) between the output voltages Va and Vb is maintained substantially at a constant value approximately corresponding to a difference value between the characteristic curves $l_{a1}$ and $l_{b1}$ irrespective of the temperature rise.

Similarly, when the ambient temperature of the permanent magnets 4a and 4b, and the Hall elements 7a and 7b is lowered below the normal temperature, the magnetic field generated by the permanent magnets 4a and 4b becomes stronger, and at the same time, the sensitivity of the Hall elements 7a nd 7b is enhanced. Thus, since the difference value (Vb−Va) between the output voltages Va and Vb of the differential amplifiers 11a and 11b is increased, the output voltage Vo of the differential amplifier 14 of the current control circuit 12 decreases and the input current supplied to the Hall elements 7a and 7b is decreased. As a result, the inclinations $\alpha_a$ and $\alpha_b$ of the output voltages Va and Vb of the differential amplifiers 11a and 11b are decreased, and the inclinations approximately coincide with the inclinations of the characteristic curves $l_{a1}$ and $l_{b1}$.

To determine the displacement detection value of the movable object, a mean value of the output voltages Va and Vb of the differential amplifiers 11a and 11b is calculated, and the calculated value is used as the displacement detection value.

Next, a second embodiment of the invention will be described with reference to FIG. 5.

This embodiment is designed to detect an abnormal state of either displacement voltage Va or Vb which is the amplified value of the output voltage of Hall element 7a or 7b.

Figure 5:
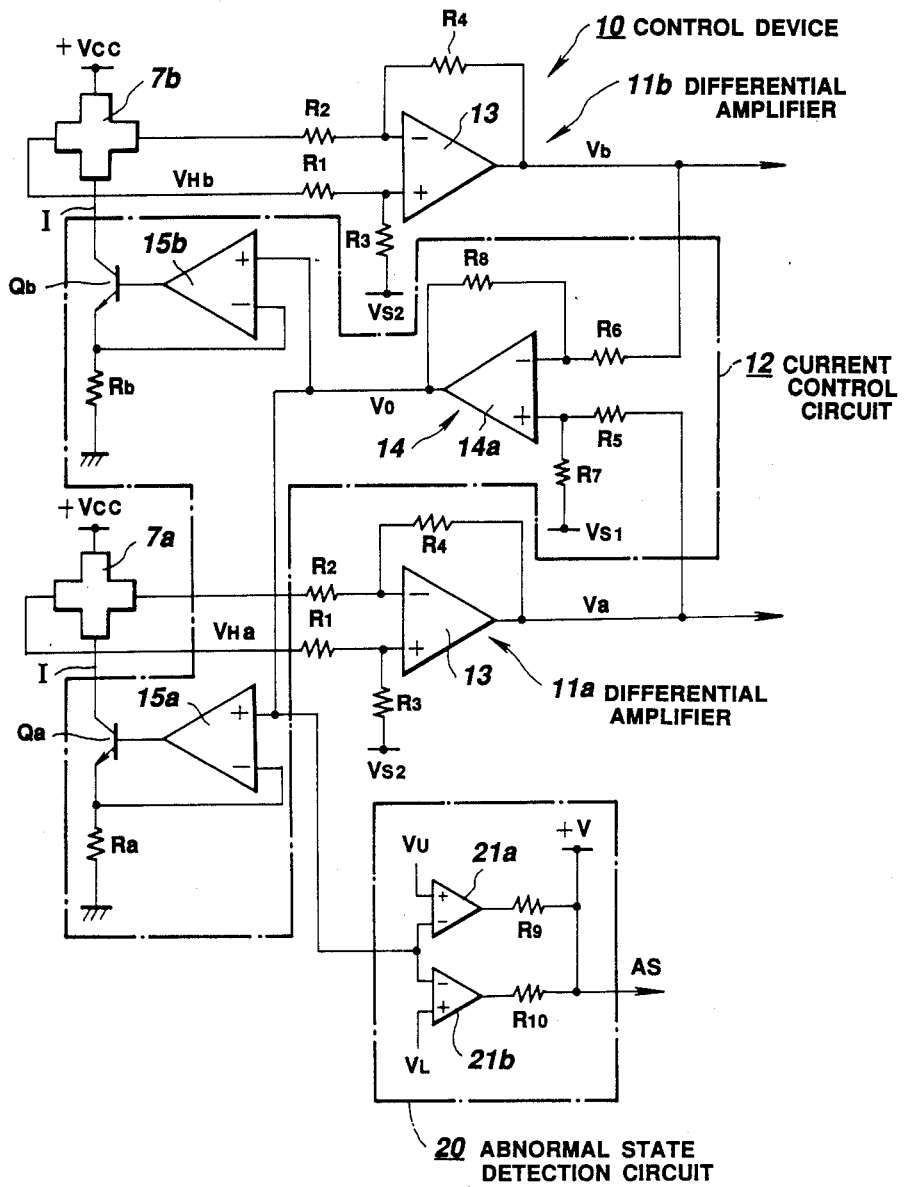
FIG. 5 is a circuit diagram of a control circuit in the other embodiment of the invention.

In FIG. 5, the arrangement is the same as that of the first embodiment of the invention with the exception that the output voltage Vo of differential amplifier 14 of current control circuit 12 is inputted to an abnormal state detection circuit 20, where the presence or absence of an abnormality of displacement detection voltages Va or Vb is detected. The parts in FIG. 5 corresponding to those of FIG. 2 are designated by identical reference numerals, and descriptions thereof are omitted.

The abnormal state detection circuit 20 includes an operational amplifier 21a having an inverting input terminal supplied with the output voltage Vo from the differential amplifier 14 and having a non-inverting terminal supplied with an upper limit reference voltage Vu. Additionally, abnormal state detection circuit 20 includes an operational amplifier 21b having an inverting input terminal supplied with the output voltage Vo from the differential amplifier 14 and having a non-inverting terminal supplied with a lower limit reference voltage $V_L$. Both the operational amplifiers 21a and 21b constitute a so-called window comparator in which output terminals thereof are connected to each other through resistors R9 and R10 respectively, and further connected to a positive DC power supply. When $Vo < V_L$ or $Vo > Vu$, an abnormal state detection signal AS is outputted from a junction point of the resistors $R_9$ and $R_{10}$. In this case, the upper limit reference voltage Vu and the lower limit reference voltage $V_L$ are set to values corresponding to difference values (Vb−Va) between the displacement detection voltages Va and Vb, which values can occur depending on temperature characteristics when the displacement detection voltages Va and Vb are at normal states, and which values further include tolerance values.

Next, the operation of this embodiment will be described. When the system, including Hall elements 7a and 7b and difference amplifiers 11a and 11b, is at a normal state, the inclinations of the output voltages Va and Vb of the difference amplifiers 11a and 11b will change depending on a change in ambient temperature of the Hall elements 7a and 7b. As a result, the difference value (Vb−Va) between the output voltages Va and Vb is changed within a predetermined range, and thus, the output voltage Vo of the difference amplifier 14 of the current control circuit 12, is also within a range of the upper limit reference voltage Vu and the lower limit voltage $V_L$; that is ($V_L \leq Vo \leq Vu$). Consequently, the abnormal detection signal AS from the abnormal state detection circuit 20 is at a low level during normal operation.

When a failure occurs in the circuit including the Hall element 7a resulting in a change in the output voltage Va of the differential amplfier 11a to an output voltage $Va_2$, the output voltage Vb having a value corresponding to displacement x of a magnet holder 3 is outputted from the other normal differential amplifier 11b. The output voltage Vo of the differential amplifier 14 based on a difference value (Vb−$Va_2$) becomes Vo<$V_L$, or Vo> Vu, and an abnormal detection signal AS of a high level is outputted from the abnormal state detection circuit 20. Thus, it is possible to detect that either one of the Hall elements 7a or 7b is in an abnormal state.

Accordingly, in the embodiment described above, it is possible to detect that either circuit including the Hall element 7a or 7b is in an abnormal state, and erroneous control which would be carried out based on the displacement detection value in the abnormal state can be reliably prevented.

Next, with reference to FIG. 6, an embodiment will be described in which the present invention is applied to a torque detector for detecting a steering torque inputted to a steering wheel of an automobile.

Figure 6:
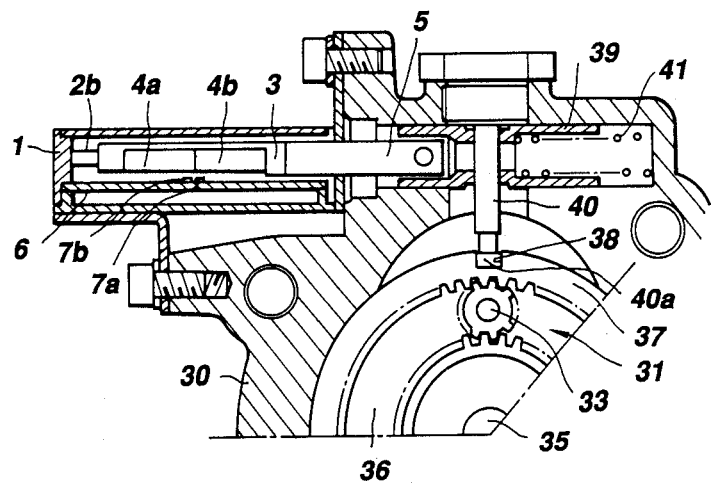
FIG. 6 is a sectional view of a torque detector to which the present invention is applied.
Figure 7A:
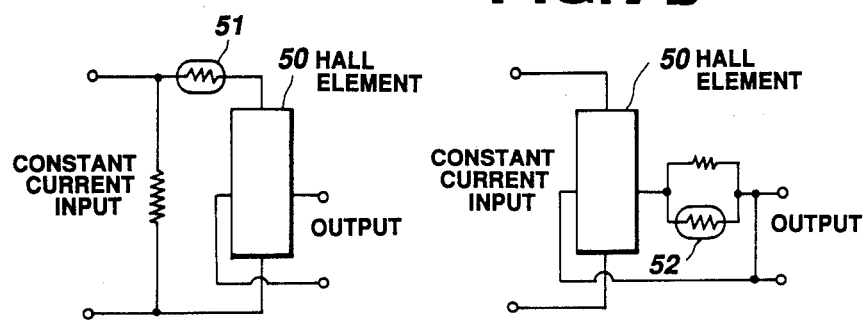
FIGS. 7a to 7c show circuit diagrams of prior art temperature compensation systems.
Figure 7B:
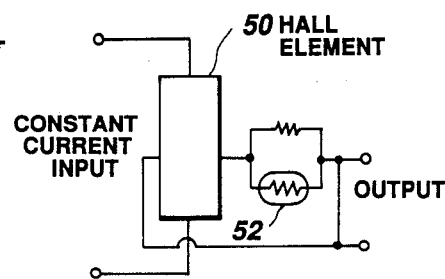
Figure 7C:
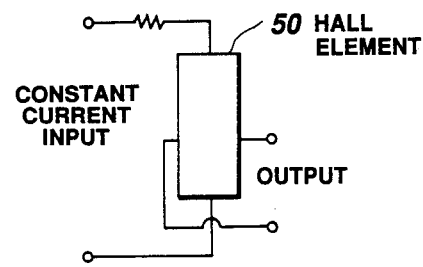

In FIG. 6, within a hollow housing 30, there are disposed with two sets of planetary gears 31 coaxially. A pinion carrier 33 of the upper planetary gear set 31 is connected to an input shaft (not shown) which is in turn connected to a steering wheel, and a pinion carrier (not shown) of the lower planetary gear set is connected to an output shaft 36 which is connected to the input shaft through a torsion bar 35. A ring gear 37, of the upper planetary gear set 31, is rotated according to a difference between rotation angles of the input shaft and the output shaft 36 due to torsion of the torsion bar 35.

An engaging recess 38 is formed in the outer surface of ring gear 37, and a sphere portion 40a of a pin 40 which is secured to a spool 39 engages the engaging recess 38. The spool 39 is slidingly and movably disposed in the housing 30 in a tangential direction to ring gear 37. The spool 39 is biased to a neutral position by a spring 41. The structure described above is similar to that shown in Japanese Utility Model Laid-Open Publication No. 59-9974.

A connection shaft 5 of a displacement detecting device is connected to the end of the spool 39. Here, the structure of the displacement detection device is similar to that shown in FIGS. 1 and 2, and indentical reference numerals are used to represent corresponding parts, and detailed description is omitted.

Next, the operation of the above embodiment will be described. When a steering torque is not applied to the steering wheel, no rotation angle difference is produced between the input shaft and the output shaft 36, and the ring gear 37 of the upper planetary gear set maintains its neutral position. Thus, the spool 39, connected to the ring gear 37 through the pin 40, is also maintained at its neutral position. As a result, the differential amplifiers 11a and 11b produce voltage $Va_N$ and $Vb_N$ respectively at intersections of the ordinate and the characteristic curves $l_{a1}$ and $l_{b1}$ in FIG. 4. Accordingly, by calculating a mean value of these voltages $Va_N$ and $Vb_N$, it is possible to detect that the displacement x is zero, corresponding to a steering torque of zero.

When the steering wheel is turned from this neutral state, for example, clockwise in FIG. 6, the ring gear 37 is turned clockwise according to the steering torque at this time, and the magnet holder 3 of the displacement detection device is moved to the right due to the movement of the spool 39 against the spring 41. As a result, the output voltages Va and Vb of the differential amplifiers 11a and 11b are increased. Since the mean value of both the output voltages is increased, the steering torque at the time of turning the steering wheel clockwise can be detected.

In the embodiments described, the magnet holder 3 is moved in accordance with the movement of the object whose displacement is detected. However, the present invention is not limited to this, and the magnets 4a and 4b may be fixed and the Hall elements 7a and 7b may be moved in accordance with the movement of the object whose displacement is to be detected.

Furthermore, in the embodiments described, the mean value of the output voltages Va and Vb of the differential amplifiers 11a and 11b is used as the displacement detection value. However, the present invention is not limited to this, and a displacement detection value may be obtained by adding or substracting a voltage corresponding to a deviation from the neutral position to or from the output of either one of the differential amplifiers.

Furthermore, the invention is not limited to the permanent magnets 4a and 4b, as electromagnets may be used.

Still further, the displacement detection device of the present invention is not limited to be applied to the torque detection device described, and it is of course applicable to detect displacement of any movable object.

As described in the foregoing, in the one aspect or embodiment of the present invention, two magnets oppositely magnetized to each other and movable according to displacement of a movable object, and first and second Hall elements disposed opposing to the two magnets and arranged in a direction of the displacement of the object with a predetermined interval therebetween are provided. The input currents supplied to both the Hall elements are controlled in accordance with a difference value between output voltages of the Hall elements. Consequently, it is possible to make the difference value between the displacement detection voltages of the Hall elements constant regardless of a change in the temperature characteristics of the Hall elements and the magnets, and also to maintain the inclinations of the displacement detection voltages of the Hall elements, that is, the rate of voltage change thereof at a constant value. Thus, it is possible to reduce an error in the sensitivity of the entire displacement detection device due to errors in distances between the magnets and the Hall elements. Therefore, an advantage is provided in that the detection of displacement can be achieved accurately.

Moreover, in the other aspect of the present invention, an abnormality detection circuit is provided to detect the presence or absence of an abnormal state by comparing an output voltage difference between the Hall elements with a reference value. Consequently, in addition to the advantage of the first aspect of the invention, it is possible to detect an abnormal state of the system including either one of the Hall elements. Thus, another advantage is provided in that it is possible to prevent the erroneous operation of control equipment which uses the displacement detection device at the time of occurrence of an abnormal state.

What is claimed is:

1. A displacement detection device for a linear displaceable movable object comprising:

a pair of magnets magnetized with opposite polarities to each other and arranged adjoining each other in a direction of linear displacement of the movable object;

a first and a second Hall element disposed at a position opposing said pair of magnets and arranged in the direction of displacement with a predetermined interval therebetween, said pair of magnets being movable relative to said first and said second Hall element with the linear displacement of said movable object; and a current control circuit for supplying said first and said second Hall element with an input current corresponding to a difference value between output voltages of said first and said second Hall element to correct the rate of change of the output voltage of each of said first and second Hall elements with respect to the linear displacement of said movable object to thereby maintain the difference value at a predetermined value representing a normal condition of said first and said second Hall element.

2. A displacement detection device according to claim 1, wherein the displacement of said movable object represents a torque applied to an input shaft by converting a difference between the rotation angles of the input shaft and an output shaft due to torsion of a torsion bar into the movement of a spool coupled to said movable object.

3. a displacement detection device for a movable object comprising:

a pair of magnets magnetized with opposite polarities to each other and arranged adjoining each other in a direction of displacement of the movable object;

a first and a second Hall element disposed at a position opposing to said pair of magnets and arranged in the direction of displacement with the predetermined interval therebetween, said pair of magnets being movable relative to said first and said second Hall element with the displacement of said movable object;

a current control circuit for supplying said first and said second Hall element with an input current corresponding to a difference value between output voltages of said first and said second Hall element; and an abnormality detection circuit for detecting the presence or absence of an abnormal state of said first Hall element or said second Hall element by comparing the difference value between the output voltages of said first and said second Hall element with a predetermined reference value corresponding to normal operation of said first and said second Hall element.

4. A displacement detection device according to claim 3, wherein the displacement of said movable object represents a torque applied to an input shaft coupled to said movable object.

* * * * *